Figure 1:
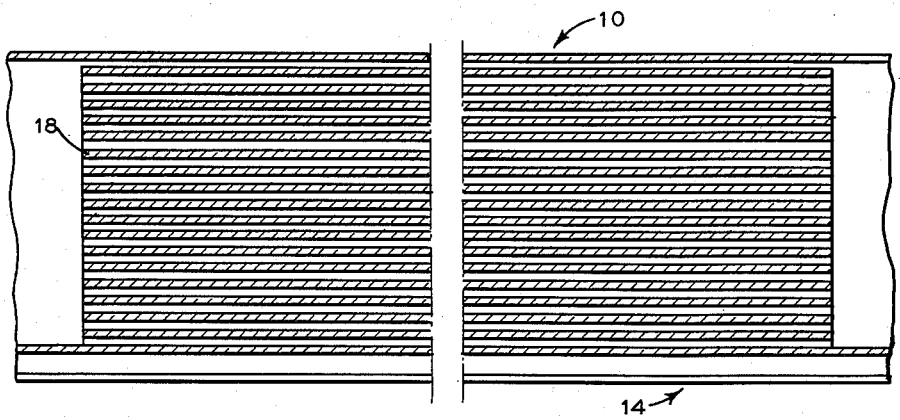

June 20, 1961     N. C. JESSEN     2,989,456

NUCLEAR REACTOR FUEL ELEMENT

Filed June 30, 1958

*INVENTOR.*
Nicholas C. Jessen

BY *J. P. Moran*

ATTORNEY

2,989,456
NUCLEAR REACTOR FUEL ELEMENT

Nicholas C. Jessen, Lynchburg, Va., assignor to The Babcock & Wilcox Company, New York, N.Y., a corporation of New Jersey
Filed June 30, 1958, Ser. No. 745,755
2 Claims. (Cl. 204—193.2)

This invention relates in general to nuclear fuel elements, but more particularly, it relates to a plate assembly type element having a multiplicity of parallel arranged fuel plates affixed between two side plates.

Plate type fuel elements are frequently used in nuclear reactors wherein they usually have fissionable material clad by a corrosion resistant material, such as aluminum. Typical of this type of fuel element is the one used in the Materials Testing Reactor as described in vol. 9, pages 203 to 207, "MTR Fuel Elements," by Cunningham and Boyle, International Conference on the Peaceful Uses of Atomic Energy, published by the United Nations, New York, 1956. That reference describes a fuel element having a multiplicity of parallel arranged fuel plates of bowed configuration supported by and between a pair of transverse side plates. The fuel plates each comprise an inner body of uranium-aluminum alloy which is surrounded on all sides by a protective cladding of aluminum. The fuel plates fit into accommodating parallel grooves cut in the inner opposing faces of the side plates. As described in the above reference, the fuel plates are assembled into the grooved side plates and are fixed therein by brazing. In the brazing process the side grooves are coated with brazing flux and the entire assembly is then heated in a furnace to as high as 1130° F. wherein the brazing compound causes the plates to become rigidly fixed within the side plates. However, during this process due to the extreme temperature on the aluminum, all of the material becomes fully annealed.

There have been special problems in the manufacture of fuel elements for use outside of the United States. Such elements are frequently limited to use of uranium enriched in the U-235 isotope to the extent of 20%. These elements have the fuel matrix alloy composed of a uranium-aluminum alloy which may contain up to 50% uranium. This is compared to the fuel alloy described in the above reference which has a uranium-aluminum alloy matrix containing generally less than 20% uranium. The thermal expansion characteristics of the fuel alloy containing a relatively large amount of uranium differs from that of the aluminum cladding such that the fuel plates are subject to warpage when fabricated by the prior art method of brazing.

A further problem encountered with brazed fuel assemblies is that any nuclear poisons which may be trapped in the brazed joints may detract from the nuclear performance of the element. Brazing fluxes which are used in the prior art brazing method generally contain significant quantities of lithium (an element having a high neutron capture cross section).

Most of the applications of fuel elements of this type call for the immersion in water of the fuel element oriented in a vertical plane. In order for the reactor to operate properly, it is essential that the water in the system be maintained at a very high level of purity. Furthermore, since aluminum is subject to corrosion in alkaline solutions, general practice demands that the pH of the water be maintained slightly on the acid side. In those cases where aluminum fuel elements of brazed construction have operated under conditions involving either no circulation of water or a very limited amount of circulation it has been found that the water immediately surrounding and contained within the fuel element becomes enriched in chloride and fluoride ions as a result of solution of some of the residual brazing fluxes. It is a well known fact that the presence of as little as 2 p.p.m. of chlorides or fluorides may result in accelerated corrosion of aluminum components. The effect of such accelerated corrosion on aluminum fuel elements may well result in a cladding failure, releasing the fission products from the fuel alloy matrix to the pool and thus causing difficulties in reactor operation.

Further it is desirable to have fuel elements of the type described made out of hard rolled plate which is not annealed. However, a fuel element of this type could not be made by the prior art fabrication system as described in the reference because an inherent feature of the brazing method is that the aluminum becomes annealed.

In accordance with the principles of the present invention, a nuclear fuel element is proposed which eliminates the corrosion susceptibility of the prior art and permits the fabrication of an element utilizing hard rolled aluminum plates. The invention proposes a new arrangement of and method of manufacturing a fuel element of the type having a pair of spaced parallel side plates with each plate having a plurality of spaced lands and grooves in the side opposite the other plate and a plurality of spaced parallel fuel bearing plates between these side plates. A plurality of small holes is formed through the lands of the side plates transverse to the direction of the grooves, at spaced positions along the length of the side plates. A corresponding set of holes is formed in the long edges of the fuel plates, such that when the fuel plates and the side plates are matched together, there is presented a continuous hole, portions of which are alternately formed by the fuel and side plates. A pin is then placed through each hole and rigidly secured so that there is formed a fuel assembly.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Figure 2:
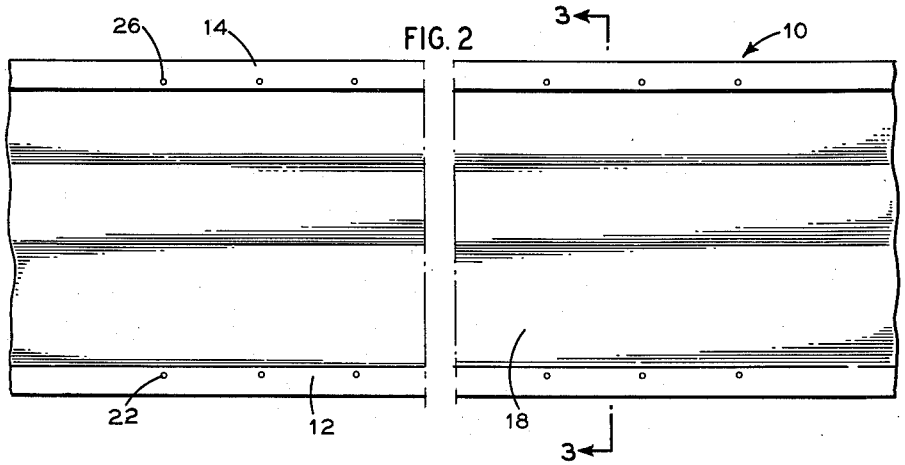
Figure 4:
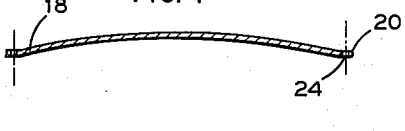
Figure 5:
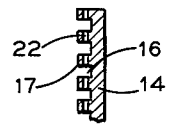
Figure 3:
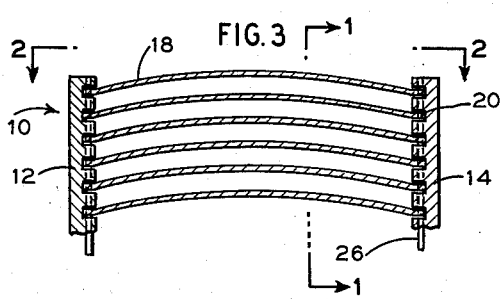

Of the drawings:
FIG. 1 is a side section of a fuel element made according to the invention;
FIG. 2 is a top view of the fuel element of FIG. 1;
FIG. 3 is a partial transverse section along the line 3—3 of FIG. 2;
FIG. 4 is a transverse section of a typical fuel plate; and
FIG. 5 is a partial enlarged end section of a side plate showing the details of the construction.

Referring to the drawings numeral 10 designates the fuel element generally which is composed of side plates 12, 14, placed in spaced parallel positions. Each of these plates is formed with a plurality of parallel longitudinally extending grooves 16. Each groove is generally of square cross section and has a land 17. In the present embodiment these plates are formed solely of aluminum and have the grooves 16 usually formed by a milling operation or any other known process.

A plurality of spaced fuel bearing plates 18 having a bowed configuration and their edges 20 bent out of the bowed plane into a single flat plane are closely fitted into the grooves 16 of the side plates 12 and 14. The general fabrication procedure of the fuel plates 18 may be accomplished by the methods described in "MTR Type Fuel Elements," by Cunningham and Boyle, as set forth above.

In accordance with the present invention, each of the side plates 12, 14 have a plurality of longitudinally spaced parallel holes 22 formed through the lands of the side plates as illustrated. Each of the fuel plates 18 have a matrix of fissionable material covered by impervious metal cladding and have corresponding holes 24 formed through the cladding in the edges 20 at the same longitudinal spacing as the holes 22 in the side plates 12 and 14. In some instances the fuel plates may be made by hard rolling the cladded plate to yield a hard or non-annealed metal to increase the strength of the assembly.

With reference of FIG. 3 there is shown the parallel plates 18 assembled between side plates 12 and 14 wherein there is illustrated a continuous hole, as indicated by the dotted lines passing through the side plates. Parts of the hole are formed alternately by side plates and the fuel element plates. A securing pin 26 is passed down through the above described hole and is affixed either by external edge welding, peening or any conventional method to the effect that the spaced fuel plates 18 and the side plates 12 and 14 are rigidly secured as an assembly.

The above illustrated fuel element may be conventionally made out of any other materials suitable for the manufacture of fuel elements, such as zirconium, zirconium-iron alloys or zirconium-aluminum alloy.

The present invention provides a simple construction of assembled fuel elements which solves the previous problems associated with cladding material corrosion and fabrication of hard or non-annealed materials. Additionally, the present invention yields more uniform gap spaces between adjacent fuel plates as no warpage occurs due to the fabrication methods used.

Although the invention has been exemplified using bowed fuel plates it is, of course, within the scope of the invention to use flat fuel plates.

While in accordance with the provisions of the statutes, I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of the other features.

I claim:

1. A nuclear fuel element comprising a pair of spaced parallel longitudinally elongated side plates of non-annealed hard metal, each plate having a plurality of parallel uniformly spaced grooves and lands in the side opposite the other plate, a plurality of spaced parallel fuel bearing plates supported by and between said side plates, each fuel plate having fissionable material covered by an impervious metal cladding of non-annealed hard metal, each fuel plate having its opposite edges fitted into corresponding grooves in the side plates to hold the fuel plates in spaced parallel relationship, a plurality of longitudinally spaced small holes in said side plates extending through the land of said grooves in a direction transverse to that of said grooves, a corresponding plurality of holes in the cladding material and along the edges of each of said fuel plates arranged in line with said holes in the side plates to form a continuous engaging hole through each side plate and fuel plate, and a pin passing through and fixed in the side plate to rigidly secure the plates together as fuel element assembly.

2. A nuclear fuel element comprising a pair of spaced parallel longitudinally elongated side plates, each plate having a plurality of parallel uniformly spaced grooves and lands in the side opposite the other plate, a plurality of longitudinally elongated and transversely bowed fuel bearing plates supported in spaced parallel relationship by and between said side plates, each fuel plate having fissionable material covered by an impervious metal cladding of non-annealed hard metal, each fuel plate having its opposite longitudinal edges bent out of the bowed plane and into a single flat plane and fitted into corresponding groves in the side plates to hold the fuel plates in spaced parallel relationship, a plurality of longitudinally spaced small holes in said side plates extending through the lands of said grooves in a direction transverse to that of said grooves, a corresponding plurality of holes in the cladding material and along the edges of each of said fuel plates arranged in line with said holes in the side plates to form a continuous engaging hole through each side plate and fuel plate, and a pin passing through and fixed in the side plate to rigidly secure the plates together as a fuel element assembly.

References Cited in the file of this patent

UNITED STATES PATENTS

| | | |
|---|---|---|
| 923,036 | Ebbels | May 25, 1909 |
| 1,196,964 | Meltz | Sept. 5, 1916 |
| 1,975,971 | Nothangel | Oct. 9, 1934 |
| 2,831,806 | Wigner | Apr. 22, 1958 |